United States Patent [19]
Horsthuis et al.

[11] Patent Number: 5,289,308
[45] Date of Patent: Feb. 22, 1994

[54] METHOD OF MAKING A FREQUENCY DOUBLING STRUCTURE IN AN OPTICALLY NON-LINEAR MEDIUM

[75] Inventors: Winfried H. G. Horsthuis, Enschede; Gustaaf R. Möhlmann, Dieren, both of Netherlands

[73] Assignee: Akzo N.V., Arnhem, Netherlands

[21] Appl. No.: 988,999

[22] Filed: Dec. 11, 1992

[30] Foreign Application Priority Data

Dec. 20, 1991 [NL] Netherlands ................ 9102138

[51] Int. Cl.$^5$ ............................................. G02F 1/37
[52] U.S. Cl. ....................... 359/328; 156/629; 156/668; 385/122
[58] Field of Search ............ 385/122, 14, 129, 130; 359/326–332; 156/625, 629, 668

[56] References Cited

U.S. PATENT DOCUMENTS

| | | | |
|---|---|---|---|
| 4,865,406 | 9/1989 | Khanarian et al. | 350/96.12 |
| 4,971,416 | 11/1990 | Khanarian et al. | 350/96.12 |
| 5,006,729 | 4/1991 | Meijer et al. | 359/328 |
| 5,028,109 | 7/1991 | Lawandy | 359/332 X |
| 5,061,028 | 10/1991 | Khanarian et al. | 359/332 X |
| 5,210,801 | 5/1993 | Fournier et al. | 385/14 |

FOREIGN PATENT DOCUMENTS

| | | | |
|---|---|---|---|
| 254921 | 2/1988 | European Pat. Off. | G02F 1/37 |
| 350112 | 1/1990 | European Pat. Off. | C08G 18/67 |
| 350113 | 1/1990 | European Pat. Off. | C08G 63/68 |
| 355915 | 2/1990 | European Pat. Off. | G02F 1/37 |
| 358476 | 3/1990 | European Pat. Off. | G03F 7/00 |
| 359648 | 3/1990 | European Pat. Off. | C08G 18/38 |
| 361602 | 4/1990 | European Pat. Off. | H01L 33/00 |
| 378185 | 7/1990 | European Pat. Off. | C08F 20/36 |
| 396172 | 11/1990 | European Pat. Off. | C08F 220/34 |
| 445864 | 9/1991 | European Pat. Off. | C08G 18/00 |
| 2187566 | 9/1987 | United Kingdom | G02F 1/37 |

OTHER PUBLICATIONS

M. S. Pereira et al., "Frequency Accommodation and Synchronisation in Digital TV Codec", Electronic Letters (Dec. 6 1990), vol. 26, No. 25, pp. 2104–2105.

W. H. G. Horsthuis et al., "Simple Measuring Method for Electro-Optic Coefficients in Poled Polymer Waveguides", Appl. Phys. Lett. 55(7), Aug. 14, 1989, pp. 616–618.

P. R. Ashley et al., "New Poling Techniques for Electro-Optic Polymer Devices", Integrated Photonics Research 1991, p. 87.

D. J. Williams, "Organic Polymeric and Non-Polymeric Materials With Large Optical Nonlinearities", Angew. Chem. Int. Ed. Engl. 23(1984), 690–703.

*Primary Examiner*—John D. Lee
*Attorney, Agent, or Firm*—Richard P. Fennelly; Louis A. Morris

[57] ABSTRACT

In an optically non-linear (NLO) polymeric material a frequency doubling structure composed of alternatingly poled NLO polymer is made. This structure can be made by forming a layer of NLO polymer, effecting poling in it with the use of an electric field, partially removing the layer of NLO polymer by etching, such that in the polymer a grating structure is formed composed of etched grooves and projecting polymer parts, the width of the grooves matching that of the polymer parts, dividing the polymer layer containing the grating structure into at least two sections, and placing the two sections one on top of the other, such that grooves of the one section are back-filled by projecting polymer parts of the other section. To prevent the enclosure of air a filler may be added, preferably in the form of a solution of the NLO polymer.

9 Claims, No Drawings

METHOD OF MAKING A FREQUENCY DOUBLING STRUCTURE IN AN OPTICALLY NON-LINEAR MEDIUM

The invention relates to a method of making a frequency doubling structure in an optically non-linear polymeric material, in which process alternating poling is effected in the optically non-linear material.

Nowadays, because of developments in the field of solid state lasers, it is possible in many optical techniques to employ electromagnetic radiation of which the wavelength falls at the nearby infrared end of the electromagnetic spectrum or even within that region thereof in which there is the presence of visible light (red). However, for many optical applications, it is desired to be able to use light of a wavelength which falls within the middle region of the visible light range or at the far removed (blue) end thereof. Examples of applications for which this is particularly desired include optical data storage, optical communication techniques, scanning, and optical medical applications. To provide a light source emitting a single wavelength in the desired region, it is known to pass electromagnetic radiation emitted by an existing light source, e.g. a laser having a wavelength in the range of, say, approximately 700 to approximately 1300 nm, through a frequency doubler, which will give a light source emitting a wavelength of half that length, i.e. in the range of approximately 350 to 650 nm. In such a method, it is known to employ optically non-linear materials as a frequency doubling structure.

Optically non-linear materials, also called non-linear optical (NLO) materials, are known. In such materials non-linear polarization occurs under the influence of an external field of force (such as an electric field). Non-linear electric polarization may give rise to several optically non-linear phenomena, including the generation of second harmonics, i.e , frequency doubling.

Polymeric NLO materials also are known. Obtaining the desired NLO effect in these macroscopically initially requires that the groups present in such a material, mostly hyperpolarizable side groups, be aligned (poled). Such poling is usually effected by exposing the polymeric material to electric (d.c.) voltage, the so-called poling field, with such heating as will render the polymeric chains sufficiently mobile for orientation.

For example, a method as described in the opening paragraph is known from U.S. Pat. No. 4,865,406. The frequency doubler disclosed in that patent comprises a substrate-supported thin layer of an alternatingly poled NLO polymer. The frequency doubling structure is made by providing the layer of NLO polymer on either side with layers of cladding and subsequently with aluminum electrodes. The aluminum electrodes are given a grating structure with the aid of a photoresist. Next, with heating, the layer of NLO polymer is exposed to an electric field. According to the description, this gives poled sections alternating with unpoled sections. However, guidelines on how to produce the disclosed alternating alignment, which is essential to practicability, are not provided.

The envisaged alternating structure is needed to prevent light subjected to frequency doubling from being wholly or partially extinguished prior to leaving the frequency doubler. Such extinction is connected with the so-called "coherence length". This is the distance between two spaced apart points, A and B, with the frequency doubled component of the light of the original wavelength travelling through the frequency doubler generated at point B being in counterphase to a frequency doubled component of the original light already generated at point A. To prevent such extinction, the periodicity of the alternatingly poled polymeric NLO material should be equal to twice the coherence length. This is known, for example, from U.S. Pat. No. 4,971,416.

The present invention has for its object to provide a method by means of which an alternatingly poled frequency doubling structure can be incorporated into an NLO polymer in a comparatively simple manner. Further, it is envisaged to provide a frequency doubling structure having the highest possible modulation depth of the poling-induced second-order NLO coefficient, $\chi^{(2)}$ (see D. J. Williams et al. in Angew. Chem. Int. Ed. Engl. 23 (1984), 690–703), and not having any change of the index of refraction occurring in the optical path, which also contributes to an improved yield.

To this end the invention resides in that the following steps are incorporated into a method of the above-mentioned known type:

forming a layer of NLO polymer; exposing the layer of NLO polymer to an electric field in order to effect poling of the NLO polymer;

partial removal of the layer of NLO polymer by etching, such that in the polymer a grating structure is formed composed of etched grooves and projecting polymer parts, the width of the grooves matching that of the polymer parts;

separating the polymer layer containing the grating structure into at least two sections; and positioning one section on top of the other, such that grooves of one section are back-filled by projecting polymer parts of the other section. Optionally, the NLO polymer may be poled after etching but prior to separation. Alternatively, the separated parts may each be poled individually prior to being fitted together. However, these embodiments are not very functional.

As a rule, a layer of viscous filler will be added before, during, or after the two sections are placed one on top of the other in order to prevent the enclosure of air. However, the optical properties of the filler should not differ greatly from those of the NLO polymer. Preferably, the selected filler will have an index of refraction which is identical or virtually identical with that of the poled NLO polymer. The use of a glue or some other adhesive is not excluded.

An advantage of the present method is that a structure of alternatingly poled NLO polymer is formed, with the alignment being wholly homogeneous. It is pertinent to note here that the object of U.S. Pat. No. 4,865,406 is presumably to apply an alternating electric poling field to obtain alternating alignment. However, the use of an alternating poling field is attended with several drawbacks, the principal one being that electrodes of different polarities have to be positioned too closely, which makes for a major chance of lateral burn-out. Because of the electrodes' edge effects (the deviating concentration of lines of force which always occurs at the electrode edge), the field profile of the poling field in the polymeric layers will deviate significantly from the desired homogeneous vertical profile. Such drawbacks can be avoided using the method according to the present invention, since the use of electrodes extending along the entire polymeric layer makes it possible to have these edge effects occur outside the polymer to be poled.

It should also be noted that the electric voltage generated by the poling field generally is d.c. voltage, but that it has also proved possible, under certain conditions described in the literature, to make use of a.c. voltage, as described in Paul R. Ashley and Thomas E. Tumolillo, *Opt. Soc. Am. Technical Digest Series,* Vol. 8, p. 87 (1991).

Preferred embodiments of the method according to the invention will be exemplified hereinbelow.

The step in which the layer of NLO polymer is formed may consist of applying a polymer solution to a suitable substrate, e.g. by means of spincoating, followed by evaporating the solvent. Suitable substrates may include silicon wafers or plastics laminates, such as those based on epoxy resin, which may be reinforced or not. Suitable substrates are known to the person of ordinary skill in the art. The substrate is not essential to the method according to the present invention. The layer of NLO polymer can also be formed by molding, injection molding, or other known processing techniques.

The layer of NLO polymer so formed is partially removed by etching, generally after having been poled, such that a grating structure, composed of grooves etched into the polymer, is formed. For the etching any suitable etching technique may be employed, e.g., those known in the manufacture of integrated circuits (ICs). For example, use might be made of wet-chemical etching techniques, e.g. with organic solvents or strong bases being employed. It is preferred, however, to make use of dry-chemical etching techniques, such as sputter etching, reactive ion etching, or reactive plasma etching. Such techniques are known to the person of ordinary skill in the art. Alternatively, there may be etching using a laser, mechanical etching, such as grinding, cutting, drilling, or etching through bombardment with sanding particles, such as alumina, silica, and more particularly, pumice. The preferred etching technique is dependent on the NLO polymer employed. The person of ordinary skill in the art is expected to be able to select an appropriate etchant for the NLO polymer in question without undue experimentation. Preferably, use is made of $O_{p2}$ plasma, and a very well defined grating structure can also be obtained using the so-called laser ablation technique.

To obtain the desired toothed structure when using non-mechanical etching techniques a mask is applied to cover those parts which should remain free from attack by the etchant. These masks, the chief prerequisite of which is that they be resistant to the action of the etchant, are known, for example, from IC technology. Such a mask may be preformed and made up of, e.g., either metal or synthetic material. Alternatively, it can be made by applying a photosensitive material (a photoresist) and subsequently exposing and developing it in accordance with the desired pattern.

Instead of etching the NLO polymer, it is also possible to produce a toothed structure without removing material, e.g. by means of embossing. In such a method the formation of grooves is attended either with heightening at the side of the grooves or with increased density of the material tamped down in the grooves.

The invention also relates to methods in which the etching step may be omitted because the layer of NLO polymer is already provided with the desired toothed structure as it is formed. Such may be achieved using shaping and processing techniques known in the treatment of polymers which are known to the person of ordinary skill in the art. As an example may be mentioned (injection) molding in a mold. In this method a thermosetting composition which is very readily moldable in the uncured state and, in general, easy to release from the mold in the cured state may advantageously be employed as the NLO polymer. The thermosetting composition is then cured in the mold with simultaneous exposure to the poling field.

The grating structure is of vital importance to the action of a frequency doubler manufactured according to the present invention, since it determines the structure of the alternatingly poled NLO polymer as it is ultimately obtained. As has been indicated above, the periodicity of the alternating structure should be equal to twice the coherence length. As appears from, for example, U.S. Pat. No. 4,971,416, which was mentioned hereinbefore, the following can be said to hold for the spatial periodicity ($\Lambda$): $\Lambda = 2l_c = 2\pi/\Delta k$, wherein $l_c$ equals the coherence length and $\Delta k$ stands for the difference in wave vectors between the frequency doubled optical wavefront and the original (frequency generating) optical wavefront.

On the basis of the wavelength of the light subjected to frequency doubling, the person of ordinary skill in the art is able to select the correct grating constant. Hence the NLO polymer layer comprises grooves (preformed or applied later) having a width equal to half of the coherence length, thus leaving polymeric sections which could be called "teeth", which teeth also have a width equal to half of the coherence length.

The layer of NLO polymer can now be divided into sections, e.g. by cutting, sawing, or otherwise cleaving in two, preferably such that two halves are formed. These sections, preferably halves, can be simply fitted together, such that the grooves of the one section will match the teeth of the other section. The resulting structure is then alternatingly poled and can be used in a frequency doubling device. It should be noted that a method of making a frequency doubling structure in which sections of a poled NLO polymer are separated and placed one on top of the other is known from European Patent Publication No. 355,915. However, at issue in this document is a frequency doubling structure of another type, i.e., one in which there is question of an interface between two layers polarized in opposite directions, with an abrupt inversion of the polarization taking place at the interface. An infrared laser beam passing parallel to the interface will form a light beam having double the original frequency.

In general, the structure of alternatingly poled NLO polymer formed using the method according to the invention will be enveloped in a cladding to yield a waveguide in the structure. The index of refraction of such a cladding is lower than that of the enclosed polymer. Depending on the NLO polymers used, it is also possible to form a waveguide by creating in the NLO polymer a channel of a higher index of refraction, e.g. by the method set forth in European Patent Publication No. 358,476.

Poling the NLO polymers in the method according to the invention is by means of the application in a known manner of an electric field. To this end, the material to be poled, which is commonly deposited on a substrate, is provided with electrodes connected to a rectified voltage feed and, e.g., placed on a controlled temperature table. Voltages of some tens to several hundreds of volts per μm of polymer layer thickness are common. The period of exposure to the electric field is generally in the range of a few seconds to several minutes, but may also be from some tens of minutes to one hour, especially when use is made of a thermosetting NLO composition. The period of time required is further dependent on the temperature at which poling takes place. As has been stated above, this temperature is dependent on the NLO polymers used, but it will generally be in the range of from about 50° to about 350° C., more particularly in the range of about 80° to about 200° C. In general, the poling field is maintained as the poled material is cooled down to ambient temperature.

Representative poling temperatures and the periods of time required in such cases are known from various patent publications. Thus, it is known from European Patent Publication No. 378,185 to expose the NLO copolymer described therein at a temperature of 85° C. to an electric field strength of $8 \times 10^5$ V/cm for a period of 20 minutes. An NLO polymer described in U.S. Pat. No. 4,865,406 is exposed for 10 minutes to an electric field strength of 70 V/μm at a temperature of 90° C. European Patent Publication No. 396,172 describes the alignment of an NLO polymer by means of corona discharge, the temperature being 127° C. In European Patent Publication No. 445,864, there is a disclosure of an NLO thermoset, a thermosetting composition is cured and poled over a period of 15 to 45 minutes at a temperature of 145° C. In European Patent Publication No. 359,648 there is a disclosure of poling for a few seconds under the influence of an electric field of 50 V/μm at a temperature of 100° C.

In a frequency doubler manufactured by the method according to the invention use may be made of known NLO polymers. Examples of such NLO polymers are those described in European Patent Publication Nos. 350,112, 350,113, 358,476, 445,864, 378,185, and 359,648, as well as those described in the U.S. patents mentioned hereinbefore. The invention is not restricted to any particular type of NLO polymer.

In addition, the frequency doubling device manufactured according to the invention may comprise all structural characteristics conceivable. For example, the device comprises a component for coupling light into the frequency doubler. For research purposes it is typical to employ a coupling prism to this end. The well-known prism coupling technique is described in, for example, *Applied Physics Letters*, 55 (1989), 616–618, and it is also used in the aforementioned U.S. patents. In actual practice, a coupling prism is not very functional and for the coupling of frequency generating light use will be preferably made of an optical fiber or a laser lens. The device further comprises a waveguide, i.e., a layer or a channel through which the coupled and the frequency doubled light can be propagated. Commonly such a waveguide will be made up of a core layer of polymer which is to some degree transparent to at least a portion of the coupled light, enveloped by cladding layers of a different polymer having a lower index of refraction for the envisaged light than the core layer does. According to the invention, the core layer comprises a frequency doubling structure as described hereinbefore. Preferably, the core layer is composed in its entirety of such an alternatingly poled structure of NLO polymer. For background data on frequency doubling devices reference is made to European Patent Publication Nos. 361,602, 355,915, and 254,921, and British Patent No. 2,187,566, as well as to *Electronics Letters*, 26 (1990), 2105-2107.

The foregoing illustrate certain embodiments of the present invention and, for that reason should not be construed in a limiting sense. The scope of protection sought is set forth in the claims which follow.

We claim:

1. A method of making a frequency doubling structure in an optically non-linear polymeric material, in which method alternating poling is effected in the optically non-linear material which comprises the following steps:
   forming a layer of NLO polymer;
   exposing the layer of NLO polymer to an electric field in order to effect poling of the NLO polymer;
   partially removing the layer of NLO polymer by etching, such that in the polymer a grating structure is formed composed of etched grooves and projecting polymer parts, the width of the grooves matching that of the polymer parts;
   dividing the polymer layer containing the grating structure into at least two sections; and
   placing the two sections one on top of the other, such that grooves of the one section are back-filled by projecting polymer parts of the other section.

2. A method according to claim 1 wherein a filler is provided between two sections which are placed one on top of the other.

3. A method according to claim 2 wherein the filler is a solution of the NLO polymer.

4. A method according to claim 3 wherein the layer of NLO polymer is formed by applying a polymeric film to a substrate.

5. A method according to claim 3 wherein the width of the grooves is equal to half of the coherence length of the second harmonic to be generated by the frequency doubling structure.

6. A method according to claim 2 wherein the layer of NLO polymer is formed by applying a polymeric film to a substrate.

7. A method according to claim 2 wherein the width of the grooves is equal to half of the coherence length of the second harmonic to be generated by the frequency doubling structure.

8. A method according to claim 1 wherein the layer of NLO polymer is formed by applying a polymeric film to a substrate.

9. A method according to claim 1 wherein the width of the grooves is equal to half of the coherence length of the second harmonic to be generated by the frequency doubling structure.

* * * * *